(12) United States Patent
Soula et al.

(10) Patent No.: US 11,534,825 B2
(45) Date of Patent: Dec. 27, 2022

(54) METHOD FOR MAKING A METAL PART WITH A COMPLEX GEOMETRY WITH A THIN WALL

(71) Applicants: SAFRAN, Paris (FR); Safran Nacelles, Gonfreville l'Orcher (FR)

(72) Inventors: Aurelie Soula, Gonfreville l'Orcher (FR); Pierre Sallot, Moissy-Cramayel (FR)

(73) Assignees: Safran Nacelles, Gonfreville l'Orcher (FR); Safran, Paris (FR)

( * ) Notice: Subject to any disclaimer, the term of this patent is extended or adjusted under 35 U.S.C. 154(b) by 301 days.

(21) Appl. No.: 16/714,391

(22) Filed: Dec. 13, 2019

(65) Prior Publication Data

US 2020/0114423 A1    Apr. 16, 2020

Related U.S. Application Data

(63) Continuation of application No. PCT/FR2018/051391, filed on Jun. 13, 2018.

(30) Foreign Application Priority Data

Jun. 13, 2017 (FR) .................................. 17/55304

(51) Int. Cl.
*B22F 3/03* (2006.01)
*B22F 3/10* (2006.01)
*B22F 3/15* (2006.01)
*B22F 5/00* (2006.01)
(Continued)

(52) U.S. Cl.
CPC ................ *B22F 3/03* (2013.01); *B22F 1/102* (2022.01); *B22F 3/1021* (2013.01); *B22F 3/15* (2013.01); *B22F 5/009* (2013.01); *B22F 2998/10* (2013.01); *B22F 2999/00* (2013.01);
(Continued)

(58) Field of Classification Search
CPC ........ B22F 3/03; B22F 1/0062; B22F 3/1021; B22F 3/15; B22F 5/009; B22F 2998/10; B22F 2999/00; F01D 25/30; F05D 2230/22; F05D 2300/603
See application file for complete search history.

(56) References Cited

U.S. PATENT DOCUMENTS 5,035,725 A    7/1991  Halpert et al.
6,090,232 A    7/2000  Seeliger et al.
(Continued)

FOREIGN PATENT DOCUMENTS

WO    2006027593    3/2006

OTHER PUBLICATIONS

International Search Report for International Application PCT/FR2018/051391, dated Aug. 30, 2018.

*Primary Examiner* — Keith Walker
*Assistant Examiner* — Ryan L Heckman
(74) *Attorney, Agent, or Firm* — Burris Law, PLLC

(57) ABSTRACT

A method for producing a thin-walled metal part with complex geometry includes mixing a metal powder with a polymer binder in order to obtain a composite mixture, producing a flexible composite sheet from the composite mixture, cutting, in the flexible composite sheet, a preform based on a contour of the metal part, applying the preform in a mold having a surface configured with a relief of the metal part, and debinding and sintering the preform in order to obtain the metal part.

12 Claims, 3 Drawing Sheets

(51) Int. Cl.
   *B22F 1/102*   (2022.01)
   *F01D 25/30*   (2006.01)

(52) U.S. Cl.
   CPC .......... *F01D 25/30* (2013.01); *F05D 2230/22* (2013.01); *F05D 2300/603* (2013.01)

(56) References Cited

U.S. PATENT DOCUMENTS

| | | | | |
|---|---|---|---|---|
| 6,244,870 | B1* | 6/2001 | Sakata | B22F 3/1283 |
| | | | | 106/38.22 |
| 6,502,623 | B1* | 1/2003 | Schmitt | C04B 41/009 |
| | | | | 164/39 |
| 6,524,421 | B1* | 2/2003 | Chen | B01D 67/0041 |
| | | | | 156/245 |
| 2006/0032328 | A1* | 2/2006 | Chikahata | C22C 33/0228 |
| | | | | 419/11 |
| 2006/0039817 | A1 | 2/2006 | Kelly | |
| 2008/0237909 | A1* | 10/2008 | Bech | F03D 1/065 |
| | | | | 264/101 |
| 2011/0266724 | A1 | 11/2011 | Hulseman et al. | |
| 2012/0103701 | A1* | 5/2012 | Cho | B23B 51/02 |
| | | | | 175/428 |
| 2012/0181733 | A1 | 7/2012 | Bischoff et al. | |
| 2014/0077403 | A1* | 3/2014 | Servant | C04B 35/63408 |
| | | | | 264/6 |
| 2016/0039163 | A1* | 2/2016 | Nakai | B30B 11/002 |
| | | | | 425/405.2 |
| 2016/0144432 | A1* | 5/2016 | Clark | B22F 3/15 |
| | | | | 419/8 |
| 2018/0009032 | A1* | 1/2018 | Kelkar | B22F 3/225 |
| 2018/0133803 | A1* | 5/2018 | Karuppoor | F04B 47/00 |
| 2018/0147757 | A1* | 5/2018 | Bernetich | C22C 32/0094 |

* cited by examiner

METHOD FOR MAKING A METAL PART WITH A COMPLEX GEOMETRY WITH A THIN WALL

CROSS-REFERENCE TO RELATED APPLICATIONS

This application is a continuation of International Application No. PCT/FR2018/051391, filed on Jun. 13, 2018, which claims priority to and the benefit of FR 17/55304, filed on Jun. 13, 2017. The disclosures of the above applications are incorporated herein by reference.

FIELD

The present disclosure relates to a method for making a metal part with a complex geometry with a thin wall.

BACKGROUND

The statements in this section merely provide background information related to the present disclosure and may not constitute prior art.

As used herein, the term "thin wall" means a wall having a thickness less than 5 mm.

The present disclosure concerns in particular, although not exclusively, the field of aeronautical parts, in particular parts for making a nacelle of an aircraft, and more particularly of the aeronautical nozzles.

There is known, in particular from U.S. Publication No. 2006/0039817, a method for making thin composite sheets intended for making cowls, in particular in the field of aircraft nacelles.

These thin composite sheets are made from an atomized metal powder from an alloy bar and mixed with a polymer binder. The obtained mixture is transformed in the form of a flexible composite sheet which is then subjected to a debinding step, that is to say a step of removing the polymer binder, followed by a sintering step, and if necessary, followed by a hot isostatic compaction step. The obtained thin composite sheet has a very low ductility such that a part with a complex geometry can be obtained only by implementing long and expensive methods. Furthermore, when the part must include appended inserts such as flanges or stiffeners, these elements must be fastened by riveting or welding.

SUMMARY

This section provides a general summary of the disclosure and is not a comprehensive disclosure of its full scope or all of its features.

The present disclosure provides a method for making a metal part with a complex geometry with a thin wall which can be implemented in a simple manner.

The present disclosure provides a method for making a metal piece with a complex geometry with a thin wall comprising the steps of mixing a metal powder with a polymer binder to obtain a composite mixture, making a flexible composite sheet from the composite mixture, cutting, in the flexible composite sheet, a preform from a contour of said metal part, applying the preform in a mold having a face configured according to a relief of said metal part, and proceeding with a debinding and sintering of the preform to obtain said metal part.

Thus, the shaping of the preform in the state of flexible composite sheet can be easily achieved even for parts with a complex geometry and the implementation of debinding and sintering operations subsequent to the shaping of the preform allow fastening the part in the desired geometry.

It will be understood that the debinding and sintering steps are carried out in the mold.

According to an advantageous version of the present disclosure, the method further includes a hot isostatic compaction step between the sintering step and the finishes. Thus, the densification obtained during sintering is accentuated.

According to a first implementation of the present disclosure, the mold is a half-shell mold including a stop surface, and the mold is disposed during the debinding and sintering steps so that the preform is held applied in the mold and against the stop surface by simple gravity. Thus, the end of the preform in contact with the stop surface constitutes a sizing reference allowing setting the metal part to the desired length by a simple sawing operation.

According to a second form of the present disclosure, the mold includes a male mold portion and a female mold portion, a first mold portion of which includes said face configured according to a relief of the metal part, and a second mold portion extends opposite the first mold portion at a distance therefrom larger than a thickness of the flexible composite sheet, and the mold includes a stop surface extending transversely to the male mold portion and to the female mold portion and disposed relative thereto so that during the debinding and sintering steps the preform comes into contact with the stop surface by simple gravity. Thus, as in the first implementation, the end of the preform in contact with the stop surface constitutes a sizing reference allowing setting the metal part to the desired length by a simple sawing operation.

According to other features considered alone or in combination: the preform is oversized to compensate for a shrinkage of the preform during the debinding and sintering steps; the preform is oversized for said metal part being trimmed by simple sawing operations; the method further includes the step of fastening an appended insert by taking a portion for fastening the appended insert sandwiched between two flexible composite sheet segments prior to the debinding step; the mold has a coefficient of expansion close to said metal part; the preform is glued prior to its application in the mold; at least one mold face opposite a flexible composite sheet preform includes contact pads separated by grooves, and in one form, considered according to a direction perpendicular to a groove, the pads and the grooves have dimensions which are related by the relationship:

$e/h<5$, where e designates the dimension of the pads according to a direction perpendicular to a groove, and h designates the width of the groove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
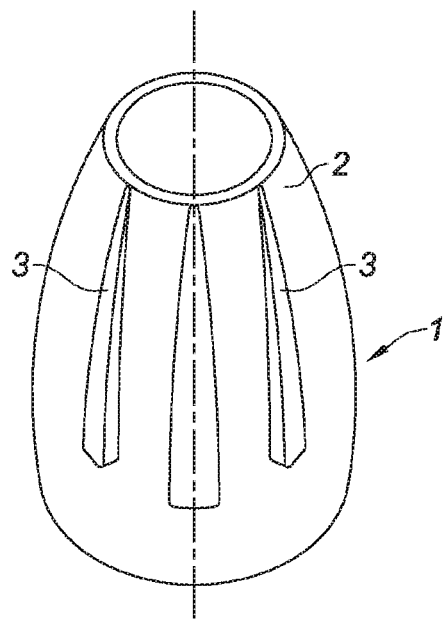
FIG. 1 is a perspective view of a nacelle exhaust nozzle made by implementing the method according to the present disclosure.
Figure 2:
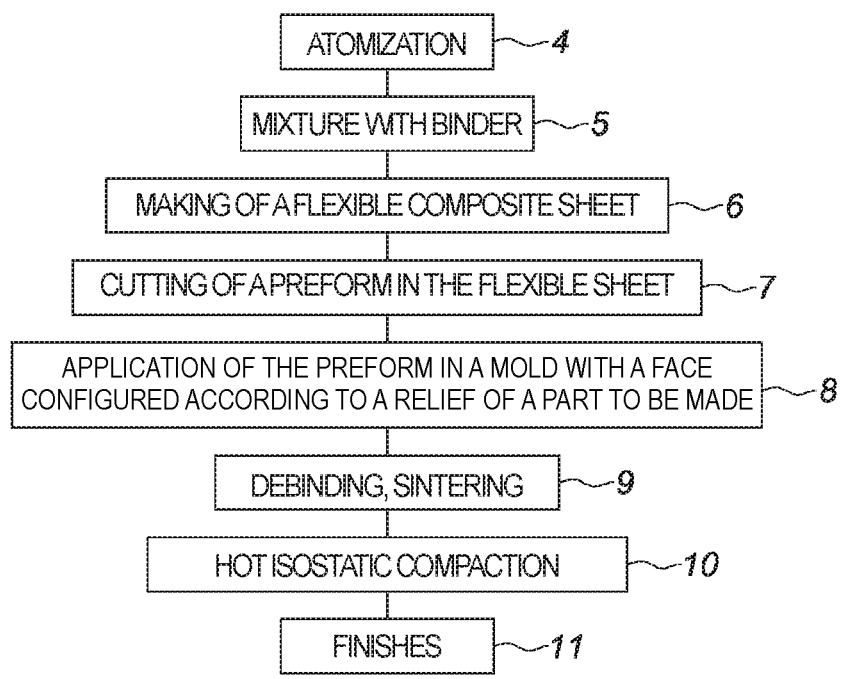
FIG. 2 is a block diagram illustrating the different steps of the method according to the present disclosure.
Figure 3:
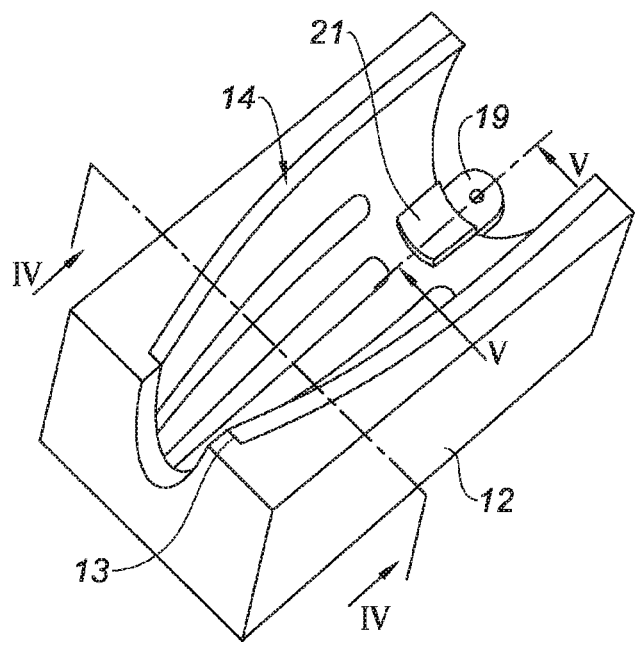
FIG. 3 is a perspective view of a mold filled with a preform before debonding and sintering for a first implementation of the method according to the present disclosure.
Figure 4:
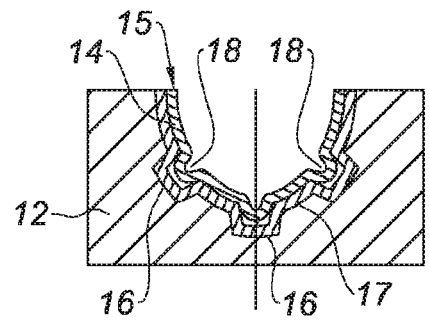
FIG. 4 is a cross-sectional view taken along the plane IV-IV of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The method according to the present disclosure is intended to enable the making of a metal part with a complex geometry with a thin wall, such as a nacelle exhaust nozzle 1 having a thin wall 2 provided with stiffeners 3. For a better understanding of the present disclosure, the thicknesses have been exaggerated compared to the other dimensions of the parts.

The method comprises, in a manner known per se, a first step 4 of atomizing an alloy bar, herein a titanium and aluminum alloy, to produce a metal powder used to perform a mixture 5 with a polymer binder, such as PBHT, PEG (polyethylene glycol), PE (polyethylene), or an acrylic resin, for making 6 a flexible composite sheet. In one form, in an application to an exhaust nozzle made from 1 mm thick sheets, the particle size is comprised between 10 μm and 45 μm, with a median size (D50) of about 30 μm, and the powder mass load is in the range of 60% to 65% and the flexible composite sheet has a thickness of 1 mm to 2 mm depending on the intended use.

According to the present disclosure, the method includes a cutting 7 of a preform followed by an application 8 of the preform in a mold having a face configured according to a relief of the metal part to be made. This step is followed by a debinding and sintering step 9 followed by a hot isostatic compaction 10, itself followed by finishes 11, such as brazing or polishing, among others.

Figure 7:
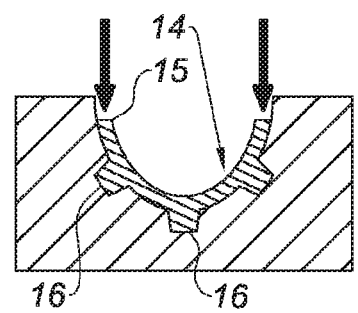
FIG. 7 is a cross-sectional view taken along the plane VII-VII of FIG. 6.

FIGS. 3 to 7 illustrate a first implementation of the present disclosure in a half-shell mold 12 including a shoulder 13 forming a stop surface for an end of the preform 14 having longitudinal edges 15 which are flush with the upper opening of the mold 12. The bottom of the mold 12 includes grooves 16 configured to make the stiffeners 3. The preform 14 is engaged in the grooves 16 by forming plies 18. During the debinding, the metal powder grains are released and can be displaced to become uniform, as illustrated by FIG. 7 before being welded to each other during the sintering operation.

The face of the preform 14 which is opposite the bottom of the mold 12 includes a glue layer 17 serving to hold the preform in the mold 12 before the sintering. The rear edge of the preform 14 coincides with the rear edge of the mold 12.

Figure 5:
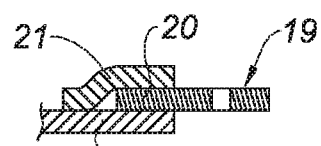
FIG. 5 is a partial cross-sectional view taken along the plane V-V of FIG. 3.
Figure 6:
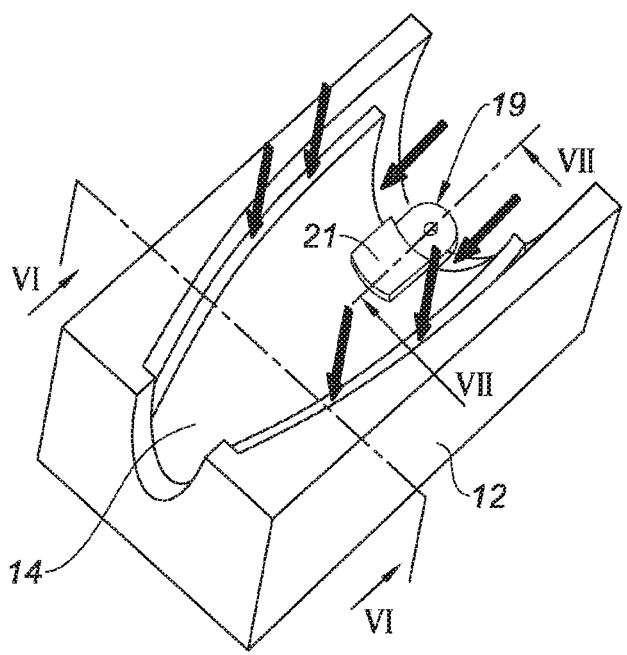
FIG. 6 is a perspective view similar to that of FIG. 3 after debinding and sintering.

An appended insert, herein a flange 19, has a fastening portion 20 which is sandwiched between the rear end of the preform 14 and a flexible composite sheet segment 21. As illustrated in FIG. 5, before the debinding and the sintering, the composite sheet segment 21 forms a bridge over the fastening portion 20.

During the debinding and sintering steps, the mold 12 is inclined downwards such that the front end of the preform 14 remains bearing on the stop surface 13. The shrinkage is therefore performed at the level of the upper edge and the rear edge of the preform as illustrated by arrows in thick line in FIGS. 6 and 7. The dimensions of the preform take this shrinkage into account so that, once out of the mold, the part that is made can be sawn to obtain a half-part of revolution which is welded edge to edge with an identical part to obtain a part of revolution.

Figure 8:
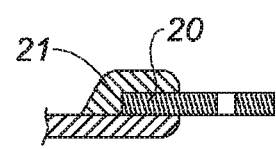
FIG. 8 is a partial cross-sectional view taken along the plane VIII-VIII of FIG. 6.

During the debinding and the sintering, the composite sheet segment 21 is deformed and intimately wraps the fastening portion 20 as illustrated in FIG. 8.

In order to inhibit the preform 14 from adhering to the mold 12 during the debinding and sintering operations, in one form, the inner face of the mold 12 is covered by spraying an anti-adhesion agent such as yttria or alumina.

In order to reduce introduction of stresses between the preform and the mold at the time of the sintering, the mold, in one form, is made of a material having a coefficient of expansion close to the flexible composite sheet. In the case of a flexible composite sheet of a Ti—Al alloy, the mold may be made of a Ti—Al alloy, but it may also be made of alumina or yttria.

Figure 9:
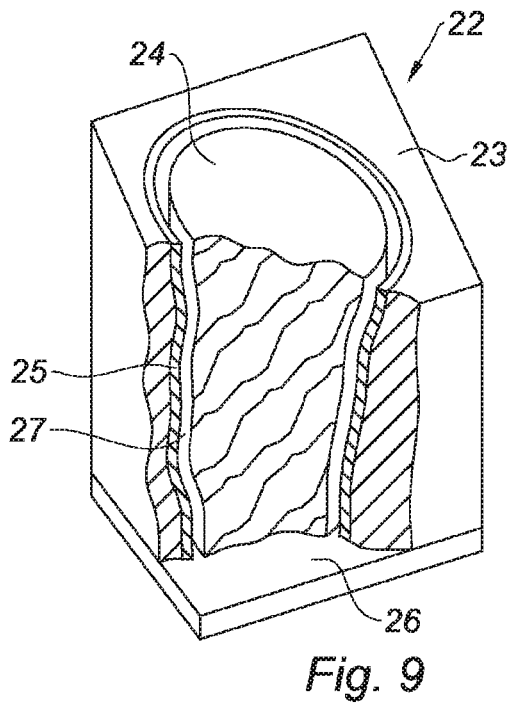
FIG. 9 is a partially broken away perspective view of a mold filled with a preform before debinding and sintering of a second implementation according to the present disclosure.
Figure 10:
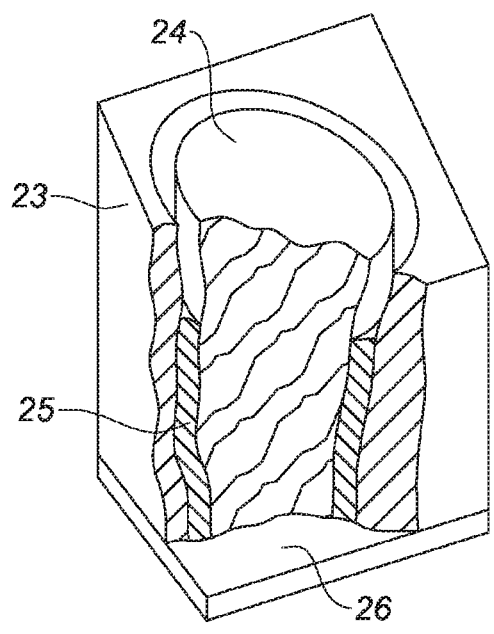
FIG. 10 is a view similar to that of FIG. 9 after debinding and sintering.

FIGS. 9 and 10 illustrate a second implementation of the method according to the present disclosure. The mold 22 includes a female mold portion 23 and a male mold portion 24 which are nested within each other after filling the female portion with a preform 25 made of a flexible composite sheet. The two mold portions are set on a base 26 which forms a common stop surface. In the illustrated example, the inner face of the female mold portion is configured according to a relief of the metal part to be made. A gap 27 of 10 μm to 1000 μm is then provided between the preform 25 and the male mold portion 24 to enable the gases from the debinding to escape. During the debinding, the metal powder settles under the effect of gravity such that the sintered metal thickness is equal to the distance between the faces opposite the male mold portion and the female mold portion.

Figure 11:
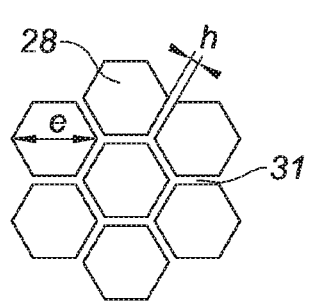
FIG. 11 is a partial top view of a first form of making a configuration promoting the elimination of the binder according to the present disclosure.
Figure 12:
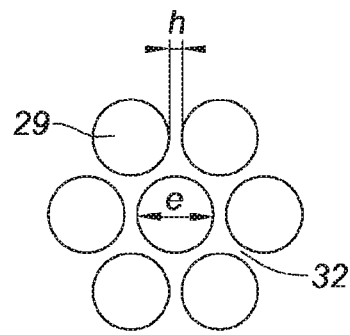
FIG. 12 is a partial top view of a second configuration promoting the elimination of the binder.
Figure 13:
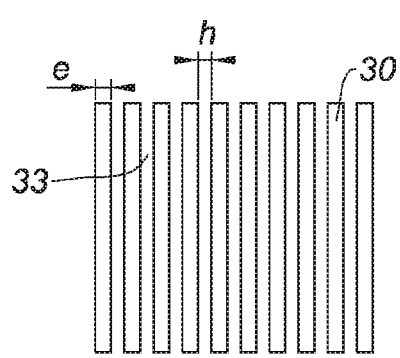
FIG. 13 is a partial top view of a third configuration promoting the elimination of the binder.

In order to allow for enhanced debinding, and in particular an evacuation without accumulation of the gases resulting from the degradation of the binders, at least one mold face opposite a preform made of a flexible composite sheet includes contact pads separated by grooves. FIGS. 11 to 13 illustrate three configuration examples, one in which the pads 28 are hexagonal, the second in which the pads 29 are circular, and the third in which the pads 30 are rectangular.

Furthermore, these three configurations have in common that: the non-bearing surface fraction relative to the total surface is from 0 to 70%; considered according to a direction perpendicular to a groove, the pads have a maximum dimension of 1 cm; the grooves, in one form, have a depth larger than 1 mm; and the grooves have a width h which is related to the dimension of the pads by the relationship:

$e/h<5$, where e designates the dimension of the pads according to a direction perpendicular to a groove, and h designates the width of the groove.

Of course, the present disclosure is not limited to the described implementations and is subject to variants which will appear to those skilled in the art without departing from the scope of the present disclosure as defined by the claims.

In particular, although the present disclosure has been described in connection with an exhaust nozzle of an aircraft, the present disclosure applies to other parts, including outside the aeronautical field.

Although the present disclosure has been described in connection with the making of parts of revolution, it is likely to apply to any part.

Although in the second implementation the preform has been provided to be applied in the female mold portion, it may be in the male mold portion, in particular in the case where the desired relief extends over the inner face of the part.

Although the present disclosure has been described in connection with a metal powder, for example, having a particle size comprised between 10 μm and 45 μm, for making a sheet having a thickness of 1 mm, the particle size may be adapted to the concerned application, and in particular to the desired surface state. As a non-limiting example, for a sheet having a thickness of 2 mm, a particle size of 10 μm to 120 μm may be provided. The load ratio may be adapted to the particle size although a load ratio of 60% to 65% is generally satisfactory regardless of the particle size of the metal powder.

Although the present disclosure has been described in connection with a metal powder made from a Ti—Al alloy, the present disclosure may be implemented from other alloys, in particular alloys containing nickel.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for making a metal part with a wall thickness less than 5 mm, the method comprising:
    mixing a metal powder with a polymer binder to form a composite mixture, the metal powder being particles of an atomized metal alloy;
    making a flexible composite sheet from the composite mixture;
    cutting, in the flexible composite sheet, a preform of the metal part;
    applying the preform in a mold having a face defining a relief of the metal part; and
    debinding and sintering the preform to form the metal part;
    wherein an appended insert has a fastening portion that is sandwiched between a rear end of the preform and a flexible composite sheet segment,
    wherein, before the debinding and the sintering steps, the composite sheet segment forms a bridge over the fastening portion, the bridge defining a gap between the composite sheet segment, the rear end of the preform, and the fastening portion, and
    wherein, during the debinding and sintering steps, the composite sheet segment deforms to fill the gap and to enclose the fastening portion of the appended insert.

2. The method according to claim 1 further comprising a hot isostatic compaction after the debinding and sintering step.

3. The method according to claim 1, wherein the mold is a half-shell mold including a stop surface, and the mold is disposed during the debinding and sintering such that the preform is applied in the mold and against the stop surface by gravity.

4. The method according to claim 1, wherein the mold includes:
    a male mold portion and a female mold portion, the female mold portion including the face configured according to a relief of the metal part, and the male mold portion extending opposite the female mold portion at a distance larger than a thickness of the flexible composite sheet, and
    a stop surface extending transversely to the male mold portion and the female mold portion and disposed relative thereto such that during the debinding and sintering, the preform comes into contact with the stop surface by gravity.

5. The method according to claim 1, wherein the preform is oversized to compensate for a shrinkage of the preform during the debinding and sintering.

6. The method according to claim 1 further comprising fastening the appended insert by taking the fastening portion of the appended insert sandwiched between two segments of the flexible composite sheet prior to the debinding and sintering.

7. The method according to claim 1, wherein the preform is glued prior to application in the mold.

8. The method according to claim 1, wherein the metal powder has a particle size between 10 μm and 120 μm.

9. The method according to claim 1, wherein the metal powder has a particle size between 10 μm and 45 μm, with a median particle size of 30 μm.

10. A method according to claim 1, wherein at least one mold face opposite the preform includes contact pads separated by grooves.

11. The method according to claim 10, wherein the contact pads and the grooves have dimensions which are related by a relationship:
    $e/h<5$, where e defines a dimension of the contact pads according to a direction perpendicular to the grooves, and h defines a width of the grooves.

12. The method according to claim 1, wherein the debinding and sintering steps are carried out in the mold.

* * * * *